sss
2,932,646
N-AMINO-NITROGEN CONTAINING HETEROCYCLIC COMPOUNDS

John H. Biel, Milwaukee, Wis., assignor, by mesne assignments, to Lakeside Laboratories, Inc., Milwaukee, Wis., a corporation of Delaware No Drawing. Continuation of application Serial No. 636,493, January 28, 1957. This application August 30, 1957, Serial No. 681,189

1 Claim. (Cl. 260—294.7)

This invention relates to hydrazine. More particularly, this invention is concerned with novel hydrazines and the corresponding hydrazones and intermediates and processes used in producing such compounds.

This application is a continuation of my copending application Serial No. 636,493, filed January 28, 1957, now abandoned.

According to the present invention there are provided novel hydrazines of the formula

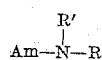

and processes and intermediates useful in preparing such compounds, wherein Am represents a nitrogen-containing heterocyclic structure, either mono or polycyclic, such as pyrrolidino, 3-hydroxypiperidino and 4-hydroxypiperidino and esters and ethers thereof, tetrahydroisoindolino, and 1, 2, 3, 4-tetrahydroisoquinolino and R and R' are hydrogen; alkyl groups, preferably lower alkyl groups of 1–8 carbons; or aralkyl groups, such as monocarbocyclic aryl-lower alkyl groups, and particularly phenyl-lower alkyl groups.

Production of primary hydrazines of the formula $$Am—NH_2$$

may be conveniently achieved by reacting a cyclic secondary amine having the nitrogen in the ring with nitrous acid to form the corresponding nitrosoamine and reducing said nitrosoamine to the desired hydrazines. This reaction may be represented broadly as follows:

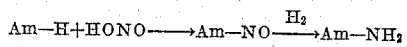

wherein Am has the significance previously assigned, and more specifically as follows, starting with a hydroxypiperidine or an ester or ether thereof:

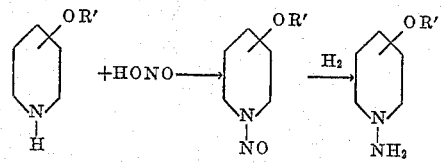

wherein R' represents hydrogen, a lower alkyl group, a monocyclic aryl group such as phenyl, a monocyclic aryl-lower alkyl group such as phenylmethyl and phenylethyl, a nuclear substituted monocyclic aryl-lower alkyl group such as p-hydroxyphenylmethyl, a disubstituted amino-lower alkyl group such as dimethylaminoethyl, and N-lower alkyl piperidyl group such as N-ethyl piperidyl, a heterocyclic alkyl group such as furfuryl or thienyl, an acyl group derived from a lower carboxylic acid such as the acetyl and propionyl groups, a monocyclic aryl-acyl group in which the acyl group is derived from a lower carboxylic acid such as phenylacetyl, benzoyl, 7-theophylline acetyl, nicotinyl and picolinyl, with the OR' group being located in the 3 or 4 position of the piperidine nucleus.

Production of such compounds may be conveniently achieved by reacting a cyclic secondary amine with nitrous acid at room temperature. The reaction may be conveniently effected in water and, in this regard, it is preferred to form the nitrous acid in situ by the use of an aqueous mixture of sodium nitrite and sulfuric acid. The reaction is completed in 1 to 2 hours. The desired nitrosoamine may be recovered by extracting the reaction mixture with an immiscible organic solvent, such as ether, and separated by evaporation of the solvent.

Usually, however, the nitrosoamine is not isolated but instead is reacted as present in the organic solvent with a reducing agent. Lithium aluminum hydride is the preferred reducing agent although catalytic processes may also be used. In addition to ether, dioxane, tetrahydrofuran, and the like may be used as reaction media in which to effect the reduction with lithium aluminum hydride. Elevated temperatures such as the reflux temperature enhance the reaction. At reflux temperatures, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried and the product distilled.

Representative compounds produced in this way are N-amino-1, 2, 3, 4-tetrahydroisoquinoline, N-amino-pyrrolidine, N-amino-tetrahydroisoindoline, N-amino-3-hydroxypiperidine and N-amino-4-hydroxypiperidine and ethers and esters of the hydroxypiperidines as set forth previously.

N-(N'-lower alkyl)-amino heterocyclic amines and N-(N'-aryl-lower alkyl)-amino heterocyclic amines are produced by reacting the primary hydrazines with a lower alkyl aldehyde or aryl-alkyl aldehyde and subsequently reducing the intermediate hydrazone to the desired N,N'-substituted hydrazines. This process may be represented as follows:

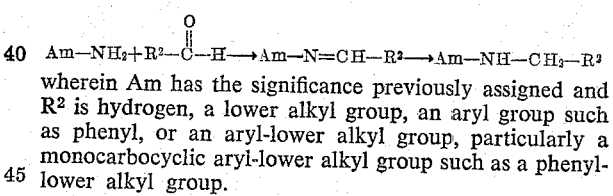

wherein Am has the significance previously assigned and R² is hydrogen, a lower alkyl group, an aryl group such as phenyl, or an aryl-lower alkyl group, particularly a monocarbocyclic aryl-lower alkyl group such as a phenyl-lower alkyl group.

Among the aldehydes which may be used in this process are formaldehyde, acetaldehyde, propionaldehyde, butyraldehyde, benzaldehyde, phenylacetaldehyde and the like.

The aldehyde and hydrazine react in the presence of water. Room temperature may be used although elevated temperatures such as the reflux temperature serve to increase the reaction rate. From 1 to 5 hours is usually sufficient to complete the reaction. Recovery of the hydrazone is conveniently achieved by conventional procedures. Thus, an alkali metal hydroxide may be used to salt out the product which may then be extracted with an organic solvent such as ether. The product may be isolated by distillation under reduced pressure.

Representative of the hydrazones so produced are N-methylidenylamino-1, 2, 3, 4-tetrahydroisoquinoline, N-ethylidenylaminopyrrolidine, N-propylidenylamino-3-hydroxypiperidine, N-hexylidenylamino-3-hydroxypiperidine, N-benzylidenylamino-4-hydroxypiperidine, N-phenylethylidenylamino-tetrahydroisoindoline and the like.

These hydrazones and others within this invention are conveniently reduced chemically or catalytically to the corresponding hydrazines. Lithium aluminum hydride is the preferred reducing agent. The reduction with this agent may be conveniently effected by intimately combining the reactants in an inert organic solvent such as anhydrous ether, dioxane and tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried, and the product distilled.

The N-(N'-lower alkyl)-amino heterocyclic amines and N-(N'-aryl-lower alkyl)-amino heterocyclic amines may also be produced by two additional processes.

One of these processes comprises reacting the primary hydrazine with a lower alkyl ester of a lower carboxylic acid or aryl-alkyl carboxylic acid followed by reduction of the intermediate hydrazide. This process may be represented as follows:

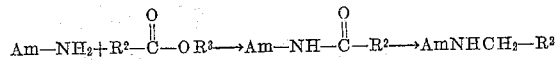

wherein Am and $R^2$ have the significance previously assigned, and $R^3$ is a lower alkyl group.

Ethyl formate, methyl acetate, ethyl propionate, methyl butyrate, methyl benzoate and ethyl phenylacetate are representative esters which may be used in the process. Reaction is conveniently achieved by refluxing the primary hydrazine and ester under suitable solvent conditions. Esters which are liquid may function both as reactant and solvent. The reaction is completed generally in several hours after which the excess solvent and reactant is removed by distillation. The product may be crystallized from a suitable solvent.

Some hydrazides prepared in this way are N-(N'-formyl) - amino-1,2,3,4-tetrahydroisoquinoline, N-(N'-acetyl) - amino-pyrrolidine, 1 - methyl-4-(N'-benzoyl)-amino-3-hydroxypiperidine, N-(N'-phenylacetyl)-amino-tetrahydroisoindoline, N - (N'-acetyl)-amino-3-hydroxypiperidine and N-(N'-formyl)-amino-4-hydroxy-piperidine.

These and other hydrazides may be conveniently reduced to the corresponding hydrazines with a suitable reducing agent of which lithium aluminum hydride is preferred.

The primary hydrazines may also be substituted by reacting them with a suitable acid halide followed by reduction of the intermediate hydrazide. This process may be represented as follows:

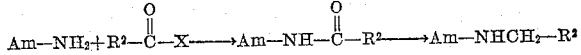

wherein Am and $R^2$ have the significance previously assigned and X is a halogen, and particularly chlorine or bromine.

Reaction between the acid halide and primary hydrazine may be carried out by mixing equimolar quantities of the acid halide and hydrazine in a suitable solvent such as ethyl alcohol, isopropyl alcohol, benzene or ethyl ether in the presence or absence of an acid acceptor such as triethylamine or tri-n-propylamine. After the reaction the hydrazide may be recovered by conventional procedures.

The secondary hydrazines of the formula

Am—NH—$R^2$ wherein $R^2$ has the significance previously assigned, may be further alkylated with an alkyl or aralkyl halide or a lower alkyl ester of a lower carboxylic acid or aryl-lower carboxylic acid. These reactions may be represented as follows:

(a) 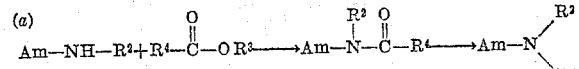

(b) 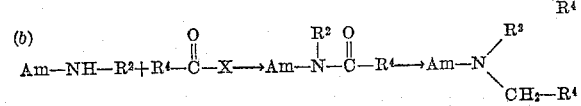

wherein Am, $R^2$, $R^3$ and X have the significance previously assigned, and $R^4$ is hydrogen, a lower alkyl group, or an aryl-lower alkyl group, particularly a monocarbocyclic aryl-lower alkyl group such as a phenyl-lower alkyl group.

Thus, N - (N' - methyl)-amino-1,2,3,4-tetrahydroisoquinoline may be reacted with ethylformate to form N-(N' - methyl - N' - formyl)-amino-1,2,3,4-tetrahydroisoquinoline which hydrazide upon reduction yields N-(N',N'-dimethyl)-amino-1,2,3,4-tetrahydroisoquinoline.

Similarly, N - (N' - ethyl)-amino-3-hydroxypiperidine may be reacted with acetyl chloride to form N-(N'-ethyl-N'-acetyl)-amino-3-hydroxypiperidine which is reduced to N-(N'-N'-diethyl)-amino-3-hydroxypiperidine.

The hydrazones and hydrazines form acid addition salts and quaternary ammonium salts.

Acid addition salts are produced by contacting the hydrazines with a suitable acid such as a mineral acid like sulfuric acid or hydrochloric acid or organic acids such as formic acid, citric acid, maleic acid and complex acids such as penicillin. Generally, one mole of the hydrazine compound reacts with one mole equivalent of acid.

Quaternary ammonium salts of the hydrazines are prepared by contacting the bases with alkylating agents, preferably in the presence of a suitable organic solvent. Alkylating agents such as lower alkyl halides, including methyl chloride, ethyl bromide, methyl bromide, alkylating agents like methyl and ethyl sulphate, as well as aryl substituted alkylating agents like o-chlorobenzyl bromide, phenylethyl chloride, and phenylpropyl bromide are representative compounds which form quaternary ammonium salts with the hydrazines.

The compounds, as non-toxic acid addition salts, have long-acting diuretic activity. In addition, these compounds are useful intermediates in the production of other compounds having diuretic activity as disclosed in my copending application Serial No. 636,491, filed January 28, 1957.

The following examples are presented to show methods of producing certain of the novel compounds included within this invention. It is to be understood, however, that these examples are included only for purposes of illustration, and that the invention is not to be restricted to the embodiments specifically disclosed therein.

EXAMPLE 1

*N-nitroso 3-hydroxypiperidine*

To 50.5 g. (0.5 mole) of 3-hydroxypiperidine and 50.5 g. of water was added 128 g. (0.39 mole) of sulfuric acid (30%) with stirring and cooling. While holding the temperature at 10–15° C., a solution of 85 g. (1.23 mole) of sodium nitrite and 150 cc. of water was added in one hour. The solution was warmed to 25° C. and stirred for an additional hour. The compound was extracted from the aqueous layer with three 100 cc. portions of chloroform. The combined extracts were washed with 30 cc. (40%) of potassium hydroxide solution, and dried briefly over anhydrous potassium carbonate. The chloroform was distilled off and the residue could not be distilled under vacuum.

Yield 40.85 g. or 62.8%.

The residue was used as such in Example 2.

EXAMPLE 2

*N-amino-3-hydroxypiperidine*

To 17.5 g. (0.45 mole) of lithium aluminum hydride in 500 cc. of freshly distilled tetrahydrofuran was added a solution of 40.85 g. (0.314 mole) of N-nitroso 3-hydroxypiperidine diluted with 300 cc. of tetrahydrofuran in a period of ninety minutes. The mixture was refluxed for one hour, and then the complex was decomposed with 100 cc. (40%) of potassium hydroxide solution. The tetrahydrofuran solution was decanted off the inorganic salts, which were washed with additional tetrahydrofuran.

The solvent was distilled off through a 10" Vigreux column and the product was vacuum distilled. B.P. 84–86° C. (0.45 mm.).

Yield 25.9 g. or 71%. M.P. 85–86° C.

*Analysis.*—Calcd. for $C_5H_{12}N_2O$: N, 12.05. Found: N, 12.04.

EXAMPLE 3

*N-amino-1,2,3,4-tetrahydroisoquinoline*

To 26.6 g. of 1,2,3,4-tetrahydroisoquinoline in 120 cc. of water are added with stirring and cooling 51 g. of 30% aqueous $H_2SO_4$. The mixture is cooled to 5–10° C. and 34.2 g. of sodium nitrite dissolved in 60 cc. of water added, keeping the temperature below 10° C. After the addition is completed, stirring is continued at room temperature for two hours. The aqueous suspension is extracted with ether and the ether extracts washed with concentrated potassium hydroxide solution. The ether extracts are dried with potassium carbonate and then added to 8.8 g. of lithium aluminum hydride suspended in 100 cc. of anhydrous ether. After completion of the addition, the mixture is stirred for two hours with refluxing and the complex decomposed with 40% aqueous potassium hydroxide. The ether layer is decanted and dried with $K_2CO_3$. The product is collected by distillation; B.P. 85° C. (0.5 mm.).

*Analysis.*—Calcd. for $C_9H_{12}N_2$: N, 9.45. Found: N, 9.35.

EXAMPLE 4

By following the procedures of Examples 1 through 3, and using as starting materials the appropriate cyclic secondary amines, the following hydrazines and salts thereof were produced:

EXAMPLE 5

*N-formylamino-1,2,3,4-tetrahydroisoquinoline*

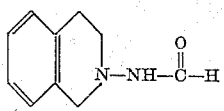

21 g. of N-amino-1,2,3,4-tetrahydroisoquinoline was added to 210 g. of ethyl formate and the mixture refluxed for 4 hours on the steam bath. The excess ethyl formate was removed by distillation, and 27 g. of solid remained which was recrystallized from 55 cc. of hot ethanol.

Yield 13.8 g. M.P. 129° C.

*Analysis.*—Calcd. for $C_{10}H_{12}N_2O$: N, 7.95. Found: N, 7.87.

EXAMPLE 6

*N-(N'-methyl)-amino-1,2,3,4-tetrahydroisoquinoline*

To 3.4 g. (0.09 mole) of $LiAlH_4$ in 150 cc. of tetrahydrofuran was added with stirring a solution of 13.6 g. (0.077 mole) of N-(N'-formyl)-amino tetrahydroisoquinoline in 160 cc. of tetrahydrofuran. The mixture was refluxed for 4 hours, the complex decomposed with 40% aqueous KOH and the product isolated by distillation. B.P. 85–88° C. (0.85 mm.).

Yield 10.8 g. (86%); $N_D^{20}$ 1.5573.

*Analysis.*—Calcd. for $C_{10}H_{14}N_2$: N, 8.64. Found: N, 8.65.

The maleate salt was prepared in ethanol, M.P. 156–157° C.

*Analysis.*—Calcd. for $C_{10}H_{14}N_2 \cdot C_4H_4O_4$: N, 5.04; maleic acid content: 41.71. Found: N, 5.00; maleic acid content: 43.12.

The mono-hydrochloride salt was prepared in ethanol, M.P. 186–187° C.

*Analysis.*—Calcd. for $C_{10}H_{15}ClN_2$: Cl, 17.85; N, 6.90. Found: Cl, 17.90; N, 7.05.

| | Hydrazine | °C./mm. | $N_D^{20}$ | Percent Nitrogen | | Salts | M.P., °C. | Percent Chloride | | Percent Maleic Acid | |
|---|---|---|---|---|---|---|---|---|---|---|---|
| | | | | Calcd. | Found | | | Calcd. | Found | Calcd. | Found |
| 1 | N—NH₂ (5-membered) | 53/40 | 1.4690 | 16.28 | 15.34 | | | | | | |
| 2 | N—NH₂ (bicyclic) | 65/1 | 1.5173 | 10.14 | 10.08 | | | | | | |
| 3 | N—NH₂ (tetrahydroisoquinoline) | 86/0.55 | 1.5793 | 9.45 | 9.35 | HCl [a] / Maleate | 208–209 / 128–130 | 19.21 / [b] 5.30 | 19.21 / 5.29 | 43.92 | 46.97 |
| 4 | OH-piperidine-NH₂ | 85/0.5 | | 12.05 | 12.04 | Maleate | 84 | [b] 6.03 | 6.04 | 50.00 | 50.00 |
| 5 | OH-piperidine-NH₂ | 86/0.15 | | 12.05 | 11.50 | | | | | | |

[a] Nitrogen assay: Calcd. 7.59. Found: N, 7.64.
[b] Nitrogen assay.

EXAMPLE 7

*N-(N'-methyl-N'-formyl)-amino-1,2,3,4-tetrahydroisoquinoline*

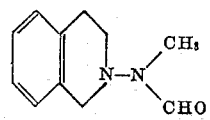

A mixture containing 16.2 g. (0.10 mole) of the compound of Example 6 and 111 g. (1.5 mole) of ethyl formate was refluxed for 7 hours. The excess ethyl formate was removed by distillation in vacuo and the product crystallized as a yellow solid, M.P. 85° C. Yield 19 g.

EXAMPLE 8

*N-(N',N'-dimethyl)-amino-1,2,3,4-tetrahydroisoquinoline*

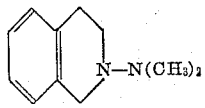

The formyl derivative of Example 7 was reduced in the manner described in Example 6. Yield 13.7 g. (77%); B.P. 85° C. (0.5 mm.) $N_D^{20}$ 1.5451.

*Analysis.*—Calcd. for $C_{11}H_{16}N_2$: N, 7.95. Found: N, 8.01.

EXAMPLE 9

*N-(N',N'-dimethyl)-amino-1,2,3,4-tetrahydroisoquinoline hydrochloride*

The salt was prepared in isopropyl alcohol, M.P. 183–184° C.

*Analysis.*—Calcd. for $C_{11}H_{17}ClN_2$: Cl, 16.88; N, 6.59. Found: Cl, 16.12; N, 6.69.

EXAMPLE 10

*N-(N'-methyl)-amino-1,2,3,4-terahydroisoquinoline hydrochloride*

The base of Example 6 was converted to the hydrochloride in ethyl alcohol, M.P. 186–187° C.

*Analysis.*—Calcd. for $C_{10}H_{15}ClN_2$: Cl, 17.85; N, 6.90. Found: Cl, 17.90; N, 6.85.

Various changes and modifications of the invention can be made and, to the extent that such variations incorporate the spirit of this invention, they are intended to be included within the scope of the appended claim.

What is claimed is:
N-amino-3-hydroxypiperidine.

References Cited in the file of this patent

UNITED STATES PATENTS 2,636,006   Ross                Apr. 21, 1953

OTHER REFERENCES

Carrara et al.: Gazz. Chim. et al., vol. 83, pp. 459–75 (1953).

Beilstein: Handbuch der org. Chem., 4th ed., 1935, vol. 20, pp. 271 and 279.

Chemical Abstracts, Decennial Index, vols. 1–10, 1907–1916, p. 4011.

Groschuff: Annalen der Chemie, vol. 417, pp. 181–189 (1918).

Zimmer et al.: Jour. Amer. Chem. Soc., vol. 77, pp. 790–3 (1955).

Beilstein: Handbuch der organischen Chemie, vol. 20, pp. 6 and 261 (1935).

Cook et al.: Jour. Phys. Chemistry, vol. 36, pp. 2383–9 (1932).